United States Patent
Ciavarella (10) Patent No.: US 10,694,899 B2
(45) Date of Patent: Jun. 30, 2020

(54) FOAM-AT-A-DISTANCE DISPENSING SYSTEMS

(71) Applicant: GOJO Industries, Inc., Akron, OH (US)

(72) Inventor: Nick E. Ciavarella, Seven Hills, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 16/374,852

(22) Filed: Apr. 4, 2019

(65) Prior Publication Data

US 2019/0307297 A1 Oct. 10, 2019

Related U.S. Application Data

(60) Provisional application No. 62/653,617, filed on Apr. 6, 2018.

(51) Int. Cl.
*A47K 5/12* (2006.01)
*A47K 5/16* (2006.01)
(Continued)

(52) U.S. Cl.
CPC .......... *A47K 5/1211* (2013.01); *A47K 5/1205* (2013.01); *A47K 5/1217* (2013.01);
(Continued)

(58) Field of Classification Search
CPC ......... B05B 7/00; B05B 7/018; B05B 7/0416; B05B 7/031; B05B 11/3087; A45D 27/06;
(Continued)

(56) References Cited

U.S. PATENT DOCUMENTS 10,034,584 B2 * 7/2018 Ciavarella ............ A47K 5/1204
10,189,698 B2 * 1/2019 Proper ................. B67D 7/0294
(Continued)

OTHER PUBLICATIONS

Invitation to Pay Additional Fees from PCT/US2019/025763 dated Jul. 1, 2019 (14 pgs).
(Continued)

*Primary Examiner* — Benjamin R Shaw
(74) *Attorney, Agent, or Firm* — Calfee, Halter & Griswold LLP (57) ABSTRACT

A dispensing system includes an above-deck nozzle portion, a reservoir for holding fluid, a foam pump, a multi-lumen dispense passage, and a mixing portion. The above-deck nozzle portion has a dispenser outlet and is disposed above a counter. The foam pump is disposed below the counter and includes at least one liquid pump chamber in fluid communication with the reservoir, at least one air pump chamber, and a pump outlet. The multi-lumen dispense passage includes an inlet, an outlet, at least one liquid lumen, and at least two air lumens. The inlet is in fluid communication with the pump outlet, the outlet is in fluid communication with the dispenser outlet, and the at least one liquid lumen and the at least two air lumens are each in fluid communication with the inlet and the outlet of the multi-lumen dispense passage. The mixing portion is disposed between the multi-lumen dispense passage and the dispenser outlet.

20 Claims, 6 Drawing Sheets

(51) Int. Cl.
*G01F 11/08* (2006.01)
*B05B 7/00* (2006.01)
*B05B 7/24* (2006.01)
*B05B 7/04* (2006.01)
*B05B 11/00* (2006.01)

(52) U.S. Cl.
CPC .............. *A47K 5/16* (2013.01); *B05B 7/0025* (2013.01); *B05B 7/0031* (2013.01); *B05B 7/0483* (2013.01); *B05B 7/2491* (2013.01); *A47K 5/1208* (2013.01); *A47K 2005/1218* (2013.01); *B05B 7/0037* (2013.01); *B05B 11/3015* (2013.01); *B05B 11/3028* (2013.01); *B05B 11/3032* (2013.01); *B05B 11/3087* (2013.01); *G01F 11/08* (2013.01)

(58) Field of Classification Search
CPC ...... A47K 5/1211; A47K 5/16; A47K 5/1217; A47K 5/1205
USPC ......................................................... 222/190
See application file for complete search history.

(56) References Cited

U.S. PATENT DOCUMENTS

| | | | | |
|---|---|---|---|---|
| 2006/0011655 | A1* | 1/2006 | Ophardt | A47K 5/16 222/190 |
| 2007/0278247 | A1* | 12/2007 | Banks | B05B 7/2497 222/132 |
| 2010/0001024 | A1* | 1/2010 | van Der Heijden | B05B 7/0025 222/190 |
| 2010/0051642 | A1* | 3/2010 | Wong | A47K 5/16 222/52 |
| 2013/0270300 | A1* | 10/2013 | Ciavarella | A47K 5/1205 222/190 |
| 2014/0263421 | A1* | 9/2014 | Urban | A47K 5/12 222/23 |
| 2014/0353334 | A1* | 12/2014 | Ciavarella | A47K 5/16 222/52 |
| 2015/0102067 | A1 | 4/2015 | Ciavarella et al. | |
| 2015/0165392 | A1 | 6/2015 | Fawcett et al. | |
| 2015/0223646 | A1* | 8/2015 | Wegelin | A47K 5/1211 222/1 |
| 2015/0320266 | A1* | 11/2015 | Creaghan | A47K 5/14 222/190 |
| 2017/0135531 | A1* | 5/2017 | Mak | A47K 5/14 |
| 2017/0135532 | A1* | 5/2017 | Ciavarella | A47K 5/14 |
| 2017/0136475 | A1* | 5/2017 | Twaroski | B05B 15/20 |
| 2017/0143172 | A1* | 5/2017 | Ciavarella | F04B 13/02 |
| 2017/0156550 | A1* | 6/2017 | Ciavarella | A47K 5/14 |
| 2017/0231437 | A1* | 8/2017 | Ciavarella | F04B 23/06 222/190 |
| 2017/0290470 | A1* | 10/2017 | Ciavarella | A47K 5/16 |
| 2018/0078958 | A1* | 3/2018 | Ophardt | A47K 5/1211 |
| 2018/0235410 | A1* | 8/2018 | Ciavarella | A47K 5/14 |
| 2018/0289223 | A1* | 10/2018 | Harris | A47K 5/16 |
| 2018/0290154 | A1* | 10/2018 | Baxter | F23K 5/22 |
| 2019/0133384 | A1* | 5/2019 | McNulty | A47K 5/1202 |
| 2019/0159636 | A1* | 5/2019 | Lo | A47K 5/1217 |
| 2019/0274487 | A1* | 9/2019 | McNulty | B67D 3/0012 |

OTHER PUBLICATIONS

International Search Report and Written Opinion from PCT/US2019/025763 dated Aug. 22, 2019 (19 pgs).

\* cited by examiner

FOAM-AT-A-DISTANCE DISPENSING SYSTEMS

RELATED APPLICATIONS

This application claims priority to, and the benefits of, U.S. Provisional Application Ser. No. 62/653,617 titled FOAM-AT-A-DISTANCE DISPENSING SYSTEMS, which was filed on Apr. 6, 2018, and which is incorporated herein by reference in its entirety.

BACKGROUND

Dispenser systems, such as soap, sanitizer, and lotion dispensers, provide a user with a selected amount of liquid upon actuation of the dispenser. Counter mount systems often have an air pump and a liquid pump located under the counter and an outlet nozzle located above the counter. In conventional systems, air and liquid are generally mixed together below the counter to form a foam that is pumped up a long dispense tube and dispensed above the counter. When there is a lengthy time period between dispenses, the foam in the dispense tube breaks down and forms a liquid at the bottom of the tube. Upon the next dispense event, the user receives a

SUMMARY

An exemplary dispensing system includes an above-deck nozzle portion, a reservoir for holding fluid, a foam pump, a multi-lumen dispense passage, and a mixing portion. The above-deck nozzle portion has a dispenser outlet and is disposed above a counter. The foam pump is disposed below the counter and includes at least one liquid pump chamber in fluid communication with the reservoir, at least one air pump chamber, and a pump outlet. The multi-lumen dispense passage includes an inlet, an outlet, at least one liquid lumen, and at least two air lumens. The inlet is in fluid communication with the pump outlet, the outlet is in fluid communication with the dispenser outlet, and the at least one liquid lumen and the at least two air lumens are each in fluid communication with the inlet and the outlet of the multi-lumen dispense passage. The mixing portion is disposed between the multi-lumen dispense passage and the dispenser outlet.

Another exemplary dispensing system includes an above-deck nozzle portion, a reservoir for holding a fluid, a foam pump, a multi-lumen dispense passage, and a mixing portion. The above-deck nozzle portion has a dispenser outlet and is disposed above a counter. The foam pump is disposed below the counter and includes at least one liquid pump chamber in fluid communication with the reservoir, a plurality of air pump chambers, and a pump outlet having a liquid passage and an air passage. The liquid passage of the pump outlet is in fluid communication with the at least one liquid pump chamber and is sealed off from the plurality of air pump chambers, and the air passage of the pump outlet is in fluid communication with the plurality of air pump chambers and is sealed off from the at least one liquid pump chamber. The multi-lumen dispense passage has at least one air lumen, at least one liquid lumen, and an outlet. The at least one air lumen is in fluid communication with the air passage of the pump outlet, and the at least one liquid lumen is in fluid communication with the liquid passage of the pump outlet. The outlet of the multi-lumen dispense passage is in fluid communication with the dispenser outlet. The mixing portion is disposed between the multi-lumen dispense passage and the dispenser outlet.

Another exemplary dispensing system includes an above-deck nozzle portion, a reservoir for holding fluid, a sequentially activated multi-diaphragm foam pump, a multi-lumen dispense passage, and a mixing portion. The above-deck nozzle portion has a dispenser outlet and is disposed above a counter. The foam pump is disposed below the counter and includes a liquid pump diaphragm, a plurality of air pump diaphragms, a pump outlet, and an actuation mechanism. The liquid pump diaphragm has a liquid pump chamber that is in fluid communication with the reservoir, and each air pump diaphragm has an air pump chamber. The pump outlet has a liquid passage and an air passage, in which the liquid passage is in fluid communication with the liquid pump chamber, and in which the air passage is in fluid communication with the air pump chambers. The actuation mechanism is configured to sequentially activate the liquid pump diaphragm and the air pump diaphragms. The sequential activation of the liquid and air pump diaphragms is such that the liquid pump diaphragm pumps at least a partial dose of liquid into the pump outlet prior to the air pump diaphragms pumping on or more doses of air into the pump outlet. The multi-lumen dispense passage has at least one air lumen, at least one liquid lumen, and an outlet. The at least one air lumen is in fluid communication with the air passage of the pump outlet, and the at least one liquid lumen is in fluid communication with the liquid passage of the pump outlet. The outlet of the multi-lumen dispense passage is in fluid communication with the dispenser outlet. The mixing portion is disposed between the multi-lumen dispense passage and the dispenser outlet.

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

Figure 1:
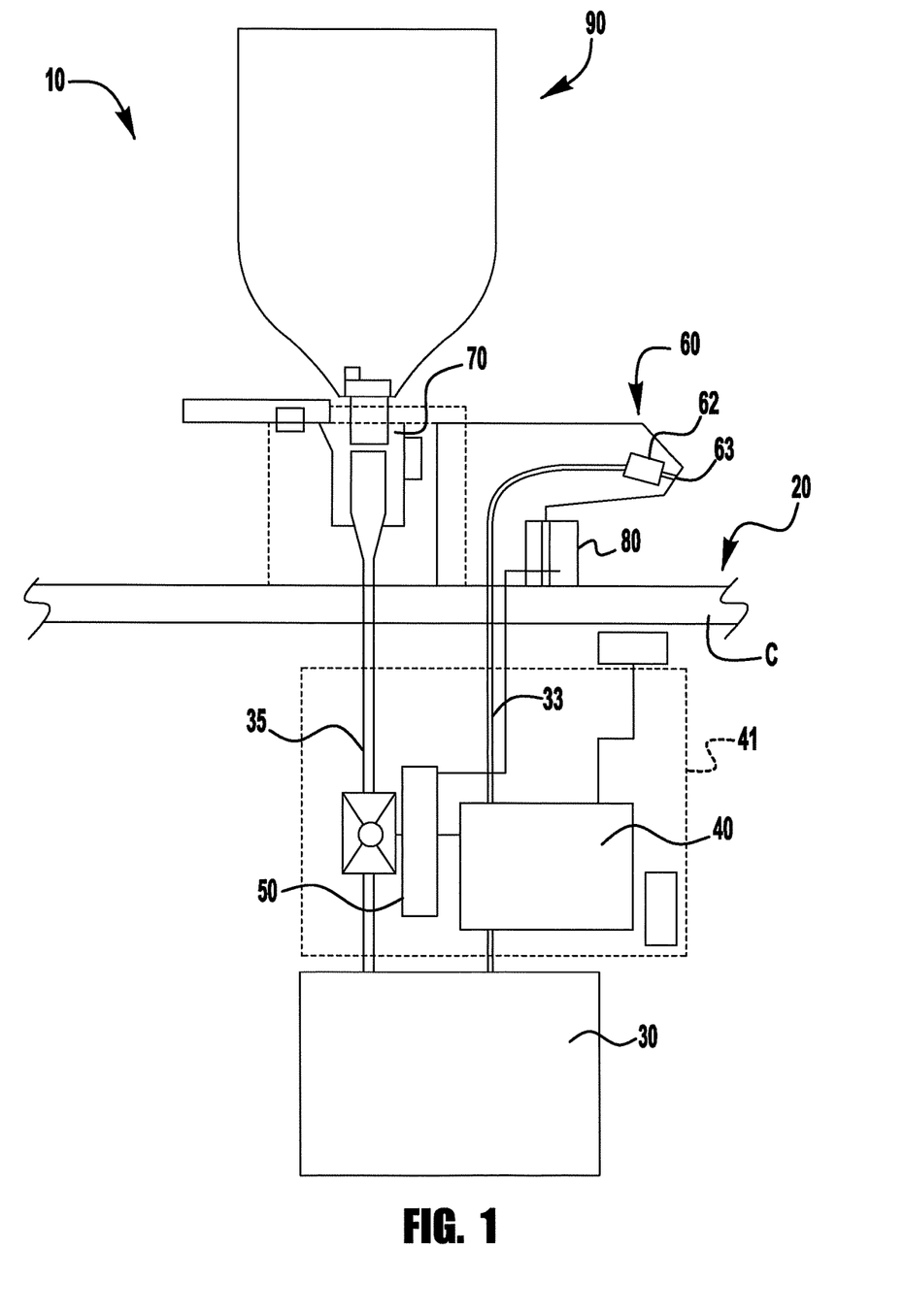
FIG. 1 is a schematic view of an exemplary embodiment of a fluid dispensing system.

FIG. 1 schematically illustrates an exemplary fluid dispensing system 10 that includes an externally filled fluid dispenser 20 and an external refill container 90. The exemplary dispenser 20 includes a below deck reservoir 30 and dispensing mechanism 40 (disposed in housing 41), an above deck spout or nozzle portion 60 having an outlet port 63 connected to the reservoir 30 by a multi-lumen dispense passage 33 and foam cartridge 62, and an external supply port 70 connected to the reservoir 30 by a supply passage 35.

The dispensing mechanism 40 is operable to pump or otherwise facilitate the flow of fluid from the reservoir 30 through the multi-lumen dispense passage 33 to the outlet port 63 in the form of a foam in response to user manipulation of a user interface (shown schematically at 80). The user interface 80 may include any suitable manual, electromechanical, or electronic actuating mechanism, including, for example, a manually depressible hand bar or plunger, an electrical switch engaging button, or a "hands free" voice, optic, motion, or proximity sensor. In the schematically illustrated example, the dispenser 20 includes a controller 50 in circuit communication with an electronic user interface 80 (e.g., button or "hands free" sensor) and in circuit communication with a dispensing mechanism 40. When the controller 50 receives an actuation signal from the user interface 80, the controller initiates operation of the dispensing mechanism 40 to dispense fluid from the reservoir 30 through the multi-lumen dispense passage 33 and foam cartridge 62 to the outlet port 63. The fluid dispensing system 10 can include various components configured to monitor and control the refilling of the fluid dispensing system, and these components can take any suitable form. An exemplary dispensing system is shown and described in U.S. Patent Publication No. 2017/0190563, titled Systems and Methods For Monitoring And Controlling Dispenser Fluid Refill, which is incorporated herein by reference in its entirety. Additional exemplary dispensing systems that may be modified to incorporate the inventive concepts disclosed herein include, for example, Under-Counter Mount Foam Dispensing Systems With Permanent Air Compressors And Refill Units for Same, U.S. Publication No. 2014/0124540, which is incorporated herein by reference in its entirety.

The dispensing mechanism 40 may be, for example, a displacement pump, such as, for example, a piston pump, a diaphragm pump, a rotary pump, or the like. In certain embodiments, the dispensing mechanism 40 may be a sequentially activated multi-diaphragm pump. Exemplary embodiments of sequentially activated multi-diaphragm pumps are shown and disclosed in: U.S. Non-Provisional application Ser. No. 15/429,389 filed on Feb. 10, 2017 and titled HIGH QUALITY NON-AEROSOL HAND SANITIZING FOAM; U.S. Non-Provisional application Ser. No. 15/369,007 filed on Dec. 5, 2016 and titled SEQUENTIALLY ACTIVATED MULTI-DIAPHRAGM FOAM PUMPS, REFILL UNITS AND DISPENSER SYSTEMS; U.S. Non-Provisional patent application Ser. No. 15/355,112 filed on Nov. 18, 2016 and titled SEQUENTIALLY ACTIVATED MULTI-DIAPHRAGM FOAM PUMPS, REFILL UNITS AND DISPENSER SYSTEMS; U.S. Non-Provisional application Ser. No. 15/350,190 filed on Nov. 14, 2016 and titled IMPROVED FOAMING CARTRIDGE; U.S. Non-Provisional application Ser. No. 15/356,795 filed on Nov. 21, 2016 and titled FOAM DISPENSING SYSTEMS, PUMPS AND REFILL UNITS HAVING HIGH AIR TO LIQUID RATIOS; and U.S. Non-Provisional application Ser. No. 15/480,711 filed on Apr. 6, 2017 and titled SEQUENTIALLY ACTIVATED MULTI-DIAPHRAGM FOAM PUMPS, REFILL UNITS AND DISPENSER SYSTEMS; each of which are incorporated herein in their entirety.

Figure 2:
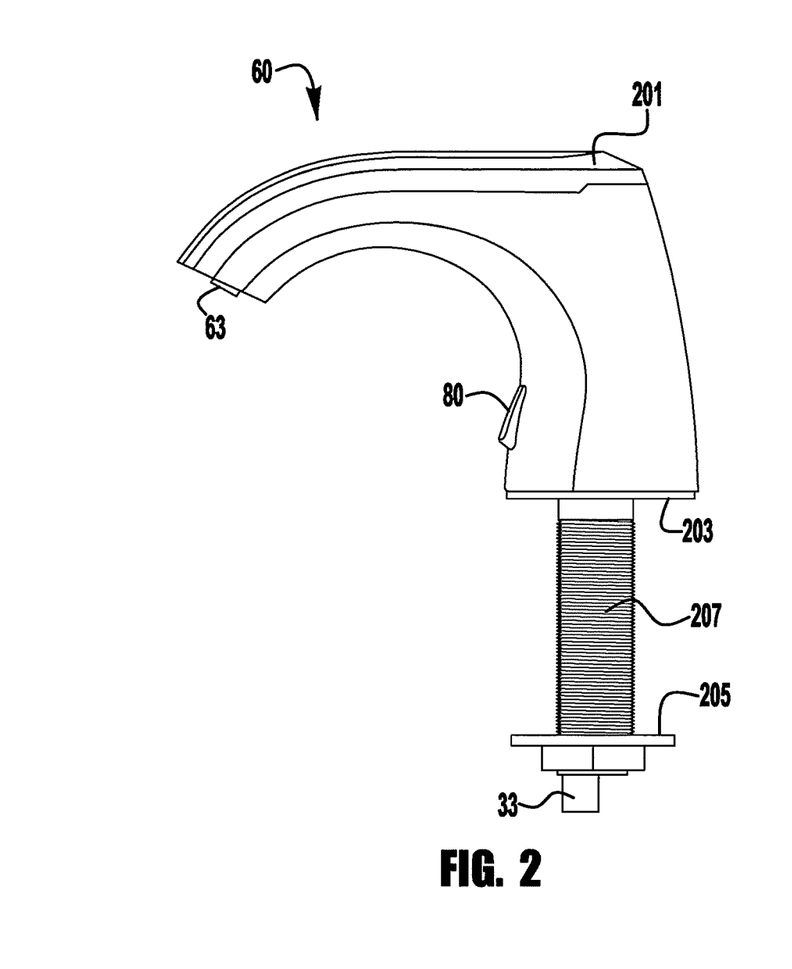
FIG. 2 is a side view of an exemplary embodiment of an above-deck nozzle portion for a fluid dispensing system.

Referring to FIG. 2, an exemplary embodiment of an above-deck nozzle portion 60 of an exemplary dispensing system is illustrated. Above-deck nozzle portion 60 has a housing 201, a dispense outlet 63, a multi-lumen dispense passage 33 in fluid communication with the dispense outlet 63, an above-deck mounting surface 203, a below-deck mounting surface 205, a threaded conduit 207 extending between the below-deck and above-deck mounting surfaces, and a user interface 80. When the nozzle portion 60 is secured to a counter, the below-deck surface 205 engages a bottom surface of the counter (not shown), the above-deck surface 203 engages a top surface of the counter, and the conduit 207 extends through the counter.

The multi-lumen dispense passage 33 extends from proximate a form cartridge (not shown) near the end of housing 201, through the housing 201, through the conduit 207, and through the below-deck surface 205, and to pump 40 (FIG. 3) such that a portion of the multi-lumen dispense passage 33 is below the counter (not shown) and a portion of the multi-lumen dispense passage 33 is above the counter. The multi-lumen dispense passage 33 is in fluid communication with a reservoir of a dispensing system (e.g., the reservoir 30 of the dispensing system 10 of FIG. 1), via pump 40.

Figure 3:
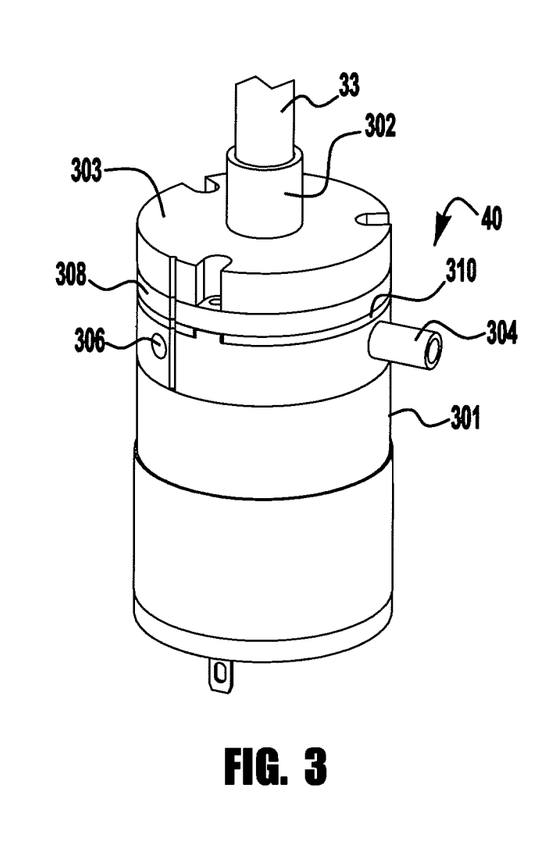
FIG. 3 is a perspective view of an exemplary embodiment of a pump and a portion of an exemplary embodiment of a fluid passage for a fluid dispensing system.
Figure 4:
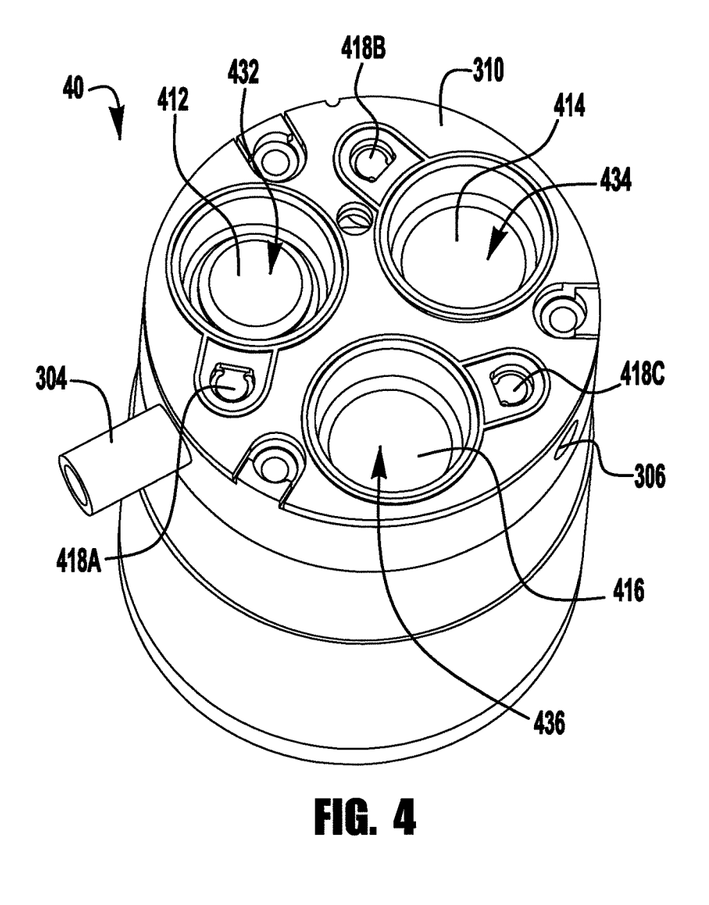
FIG. 4 is a perspective view of an exemplary embodiment of a portion of a pump showing three pump chambers for the pump of FIG. 3.
Figure 5:
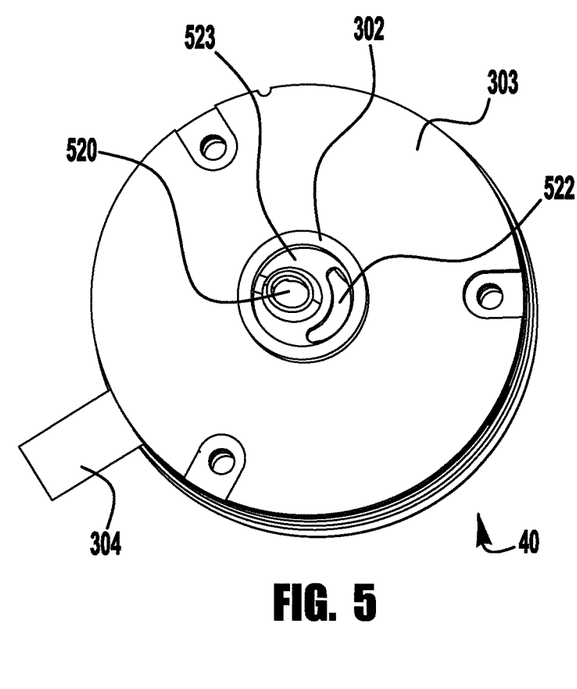
FIG. 5 is a perspective view of an exemplary embodiment of a pump outlet for the pump of FIG. 3.
Figure 6:
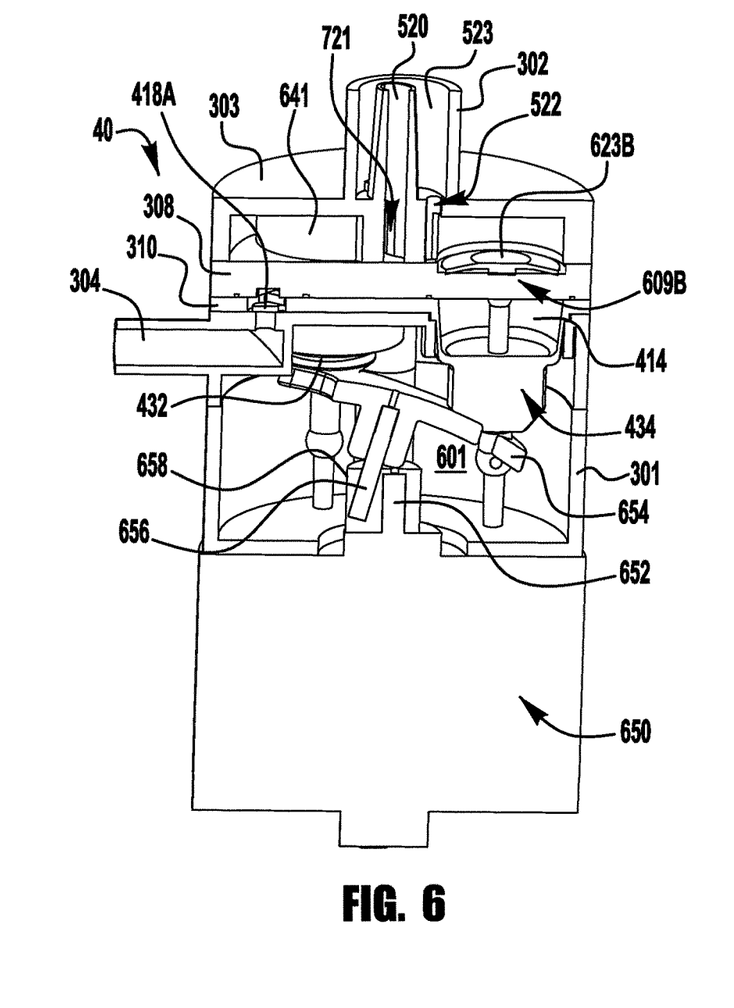
FIG. 6 is a cross-sectional view of an exemplary embodiment of a liquid pump portion for the pump of FIG. 3.
Figure 7:
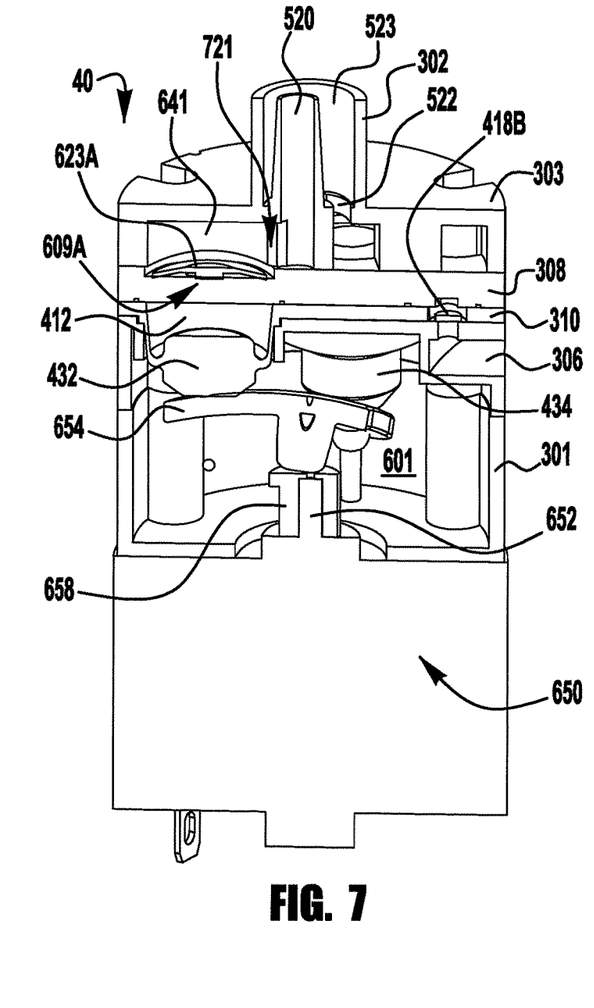
FIG. 7 is a another cross-sectional view of an exemplary embodiment of an air pump portion for the pump of FIG. 3.

FIGS. 3-7 illustrate an embodiment of an exemplary pump 40 that is configured to separately pump both air and liquid out of a pump outlet 302 and into the multi-lumen dispense passage 33. FIG. 3 is a perspective view of pump 40; FIG. 4 is a perspective view of the diaphragm assembly 310; FIG. 5 is perspective top view of pump 40; and FIGS. 6 and 7 are cross-sectional views of pump 40.

The pump 40 includes a housing 301, a motor 350, a diaphragm assembly 310 disposed within the housing, a valve seat 308, and a cover 303 that includes a pump outlet 302. The pump 40 also includes a liquid inlet 304 that is in fluid communication with a liquid pump chamber 412 and an air inlet that is in fluid communication with first and second air pump chambers 414, 416. In various embodiments, the liquid inlet 304 is connected to a liquid reservoir of a dispensing system (e.g., the reservoir 30 of the dispensing system 10 of FIG. 1). While pump 40 is shown having one liquid pump chamber and two air pump chambers pump 40 may have many different numbers of liquid pump chambers and air pump chambers. In some embodiments, there is more than one liquid pump chamber; in some embodiments there is more than two air pump chambers, in a preferred embodiment, for example, pump 40 may have four pump chambers, one liquid pump chamber and three air pump chambers. An exemplary pump having four pump chambers are shown and disclosed in U.S. patent Ser. No. 15/480,711 titled Sequentially Activated Multi-Diaphragm Foam Pumps, Refill Units and Dispenser Systems, which is incorporated herein in its entirety by reference.

Referring to FIGS. 2 and 3, the multi-lumen dispense passage 33 is connected to and in fluid communication with the pump outlet 302, and the pump 40 is configured to separately pump liquid and air through the pump outlet 302 and through the multi-lumen dispense passage 33, such that the air and liquid are combined at the end of multi-lumen dispense passage 33 proximate a mixing chamber (not shown) having a foam mixing cartridge 62 prior to being expelled out of the dispense outlet 63 in the form of a foam. In some embodiments, mixing cartridge includes one or more screens, baffles, sponges, non-woven material or the like. In some embodiments, two or more screens, baffles, sponges, or pieces of non-woven material are located in the mixing cartridge 62. In some embodiments, when two or more screens, baffles, or sponges are provided, there is a space between them. In some embodiments, a non-woven material is located in the mixing cartridge and a screen is located downstream of the non-woven material.

Referring more particularly to FIGS. 4-7, the pump 40 is a sequentially activated multi-diaphragm pump that includes a liquid pump diaphragm 432, a first air pump diaphragm 434, and a second air pump diaphragm 436. The liquid pump diaphragm 432 has a liquid pump chamber 412, the first air pump diaphragm 434 has a first air pump chamber 414, and the second air pump diaphragm 436 has a second air pump chamber 416. In some embodiments, the liquid pump chamber 412 may have a volume between about 0.02 ml and about 0.1 ml. The air pump chambers 414, 416 may have a volume between about 0.05 ml and about 0.5 ml. In certain embodiments, the volume of the liquid pump chamber 412 is less than the volume of the air pump chambers 414, 416. The volume of the liquid pump chamber 412 and the air pump chambers 414, 416 are selected based on the desired amount of liquid and air (or liquid/air ratio) that are to be pumped through the pump outlet 302.

The pump 40 includes a diaphragm assembly 310 that includes three pump diaphragms 432, 434, 436. The diaphragm assembly 310 can be made of, for example, natural rubber, EPDM, Silicone rubber TPE, TPV, vinyl, or the like. The diaphragm assembly 310 is attached to the housing 301 such that the liquid inlet 304 is in fluid communication with the liquid pump chamber 412, and the air inlet 306 is in fluid communication with the air pump chambers 414, 416. In some embodiments, each air pump chamber 414, 416 is in fluid communication with the same air inlet 306. In other embodiments, the pump 40 includes multiple air inlets 306, and each air inlet is in fluid communication with a single air pump chamber 414, 416 (as shown in FIG. 7). The diaphragm assembly 310 includes one-way inlet valves 418A, 418B and 418C that allow air or liquid to enter the respective pump chamber 412, 414, 416 when the pump chamber has a negative pressure (i.e., when the pump chamber is expanding), and the valves 418 remain in a closed position when the pump chamber has a positive pressure (i.e., when the pump chamber is compressing). In certain embodiments, the one-way inlet valves 418A, 418B and 418C are flapper valves formed by flexible tabs that are made of the same material as the diaphragm assembly 310. The one-way inlet valves 418A, 418B and 418C, however, can take any suitable form that allows air or liquid to enter a pump chamber 412, 414, 416 when the pump chamber has a negative pressure, and remains in a closed position when the pump chamber has a positive pressure. In some embodiments, the one-way inlet valves are separate from the diaphragm assembly. The diaphragm assembly 310 can take any suitable form, such as, for example, any form described in U.S. Non-Provisional application Ser. No. 15/355,112 filed on Nov. 18, 20016 and titled SEQUENTIALLY ACTIVATED MULTI-DIAPHRAGM FOAM PUMPS, REFILL UNITS AND DISPENSER SYSTEMS; or those described in U.S. Non-Provisional application Ser. No. 15/480,711 filed on Apr. 6, 2017 and titled SEQUENTIALLY ACTIVATED MULTI-DIAPHRAGM FOAM PUMPS, REFILL UNITS AND DISPENSER SYSTEMS; each of which are incorporated herein in their entirety.

The pump 40 can include a valve seat 308 that includes pump chamber outlets 609A, 609B, 609C that are configured to receive one-way outlet valves 623A, 623B, 623C. The pump chamber outlets 609A, 609B, 609C are in fluid communication with the pump outlet 33, such that compression of the liquid pump chamber 412 causes liquid to move through the corresponding pump chamber outlet 609A and through the pump outlet 302, and such that compression of the air pump chambers 414, 416 causes air to move through the corresponding pump chamber outlets 609B, 609C and through the pump outlet 302. The one-way outlet valves 623A, 623B, 623C are normally closed and prevent liquid and air from entering the pump chambers 412, 414, 416 through the pump chamber outlets 609A, 609B, 609C. The valve seat 308, the pump chamber outlets 609A, 609B, 609C, and the one-way outlet valves 623A, 623B, 623C can take any suitable form, such as, for example, any form described in U.S. Publication No. 2017/0135532, which is incorporated herein by reference in its entirety.

Referring to FIGS. 5-7, the cover 303 is attached to the valve seat 308 such that the pump chamber outlets 609A, 609B, 609C are in fluid communication with the pump outlet 302. The pump outlet 302 includes a liquid passage 520 and an air passage 522, and the cover 303 and the valve seat 308 are attached such that the pump chamber outlet 609A corresponding to the liquid pump chamber 412 is in fluid communication with the liquid passage 520 of the pump outlet 302, and such that the pump chamber outlets 609B, 609C corresponding to each air pump chamber 414, 416 are in fluid communication with the air passage 522 of the pump outlet 302. In addition, the cover 303 and the valve seat 308 are attached such that the air pump champers 414, 416 are not in fluid communication with the liquid passage 520 of the pump outlet 302, and such that the liquid pump chamber 412 is not in fluid communication with the air passage 522 of the pump outlet 302. That is, the liquid passage 520 is sealed off from the air pump chambers 414, 416, and the air passage 522 is sealed off from the liquid pump chamber 412.

Referring to FIGS. 6 and 7, at least one of the cover 303 and the valve seat 308 includes a wall portion 641 that seals off and separates the liquid pump chamber 412 from the air passage 522, and the seals off and separates the air pump chambers 414, 416 from the liquid passage 520. In the illustrated embodiment, the wall portion 641 has an opening 721 that is in fluid communication with the liquid passage 520 of the pump outlet 302, and that is not in fluid communication with the air passage 522 of the pump outlet 302. Referring to FIGS. 5-7, in the illustrated embodiment, the pump outlet 302 includes an area 523 that is configured to receive the multi-lumen dispense passage 33 (FIGS. 2 and 3). The multi-lumen dispense passage 33 includes a liquid portion (e.g., liquid lumen 901 in FIG. 9) and an air portion (e.g., air lumens 903 in FIG. 9), and the multi-lumen dispense passage 33 is inserted into the area 523 of the pump outlet 302 such that the air passage 522 is in fluid communication with the air portion of the dispense passage, and such that the liquid passage 520 of the pump outlet 302 is in fluid communication with the liquid portion of the dispense passage. In certain embodiments, the air passage 522 is shaped such that the air passage 522 does not extend past the wall 641 (FIGS. 6 and 7) that seals the liquid pump chamber 412 from the air passage 522. In the illustrated embodiment, the air passage 522 has a rounded shape (as shown in FIG. 5) that is positioned proximate the air pump chambers 414, 416 when the diaphragm assembly 310, the valve seat 308, and the cover 303 are attached to the pump housing 301. The air passage 522, however, can take any other suitable form that does not extend past the wall 641 that seals the liquid pump chamber 412 from the air passage 522.

Referring to FIGS. 6 and 7, the exemplary pump 40 includes a motor 650, a motor shaft 652, a wobble plate 654, a wobble plate pin 656, and an eccentric wobble plate drive 658. The motor 650 drives the motor shaft 652, which causes the motor shaft 652 to rotate. The rotation of the motor shaft 652 causes the eccentric wobble plate drive 658 to rotate, and rotation of the eccentric wobble plate drive 658 causes the wobble plate pin 656 to move along a circular path, which causes the wobble plate 654 to undulate. The pump diaphragms 432, 434, 436 are connected to the outer portion of the wobble plate 654. As the wobble plate 654 undulates, the outer portion of the wobble plate 654 moves between an upward and downward directions, which causes the pump diaphragms 432, 434, 436 to move between a compressed state and an expanded state, and the undulation of the wobble plate 654 causes the pump diaphragms to be compressed sequentially. As a result, one sequence of operation of the pump 40 includes one pump by each of the three pump diaphragms 432, 434, 436. In certain embodiments, the liquid pump diaphragm 432 operates first in the sequence of operation, followed by sequential operation of the air pump diaphragms 434, 436. The motor 650, motor shaft 652, wobble plate pin 656, and eccentric wobble plate drive 658 may take any suitable form, such as, for example, any form described in U.S. Publication No. 2017/0135532, which is incorporated herein by reference in its entirety. In alternative embodiments, rather than using a wobble plate to sequentially activate the pump 40, any other suitable actuation mechanism can be used to sequentially activate the pump 40.

Still referring to FIGS. 6 and 7, movement of the liquid pump diaphragm 432 from the expanded state (as shown in FIG. 7) to the compressed state (as shown in FIG. 6) causes liquid to move from the liquid pump chamber 412 through the corresponding pump chamber outlet 609A, through the opening 721 in the wall portion 641, and into the liquid passage 520 of the pump outlet 302. Subsequently, the wobble plate 654 causes the liquid pump diaphragm 432 to move back to the expanded state, which creates a negative pressure in the liquid pump chamber 412 due to the expansion of the volume of the liquid pump chamber 412. This negative pressure in the liquid pump chamber 412 causes liquid to move from a liquid reservoir, through the liquid inlet 304, past the corresponding one-way inlet valve 418, and into the liquid pump chamber 412, such that the next compression of the liquid pump diaphragm 432 causes the liquid to move through the liquid passage 520 of the pump outlet 603.

Similar to the liquid pump diaphragm 432, movement of the first air pump diaphragm 434 from the expanded state to the compressed state causes air to move from the first air pump chamber 414, through the corresponding pump chamber outlet 609B, and into the air passage 522 of the pump outlet 302. Subsequently, the wobble plate 654 causes the air pump diaphragm 434 to move back to the expanded state, which creates a negative pressure in the first air pump chamber 414 due to the expansion of the volume of the first air pump chamber 414. This negative pressure in the first air pump chamber 414 causes air to move through the air inlet 306, past the corresponding one-way inlet valve 418B, and into the first air pump chamber 414, such that the next compression of the first air pump diaphragm 434 causes the air to move through the air passage 522 of the pump outlet 603. While the second air pump diaphragm 436 and the second air pump chamber 416 are not shown in FIGS. 6 and 7, it should be understood that the second air pump diaphragm 436 and the second air pump chamber 416 is moved by the wobble plate 654 in a similar manner to the first air pump diaphragm 434 and the first air pump chamber 414. In the illustrated embodiment, the pump 40 includes an air inlet 306 that corresponds to each air pump chamber 414, 416. In other embodiments, a single air inlet can extend through the housing 301 to allow air to flow into the open area 601 of the housing 301, and the air pump chambers 414, 416 are in fluid communication with the open area 601 such that expansion of the air pump diaphragms 434, 436 causes air to move from the open area 601, past the corresponding one-way valve 418, and into the corresponding pump chamber 414, 416.

A sequence of operation of the pump 40 includes one shot of liquid moving through liquid passage 520 of the pump outlet 302, followed by two sequential shots of air moving through the air passage 522 of the pump outlet 302. While the illustrated embodiment shows the pump 40 including one liquid pump diaphragm and two air pump diaphragms, it should be understood that the pump 40 can include any suitable number of liquid pump diaphragms and air pump diaphragms. In addition, while the illustrated embodiment, shows the pump 40 being a sequentially-activated diaphragm pump, it should be understood that any suitable foam pump can be used in the dispensing system 10. For example, the pump can be a piston pump having one or more liquid pump chambers and one or more air pump chambers.

Figures 8, 9:
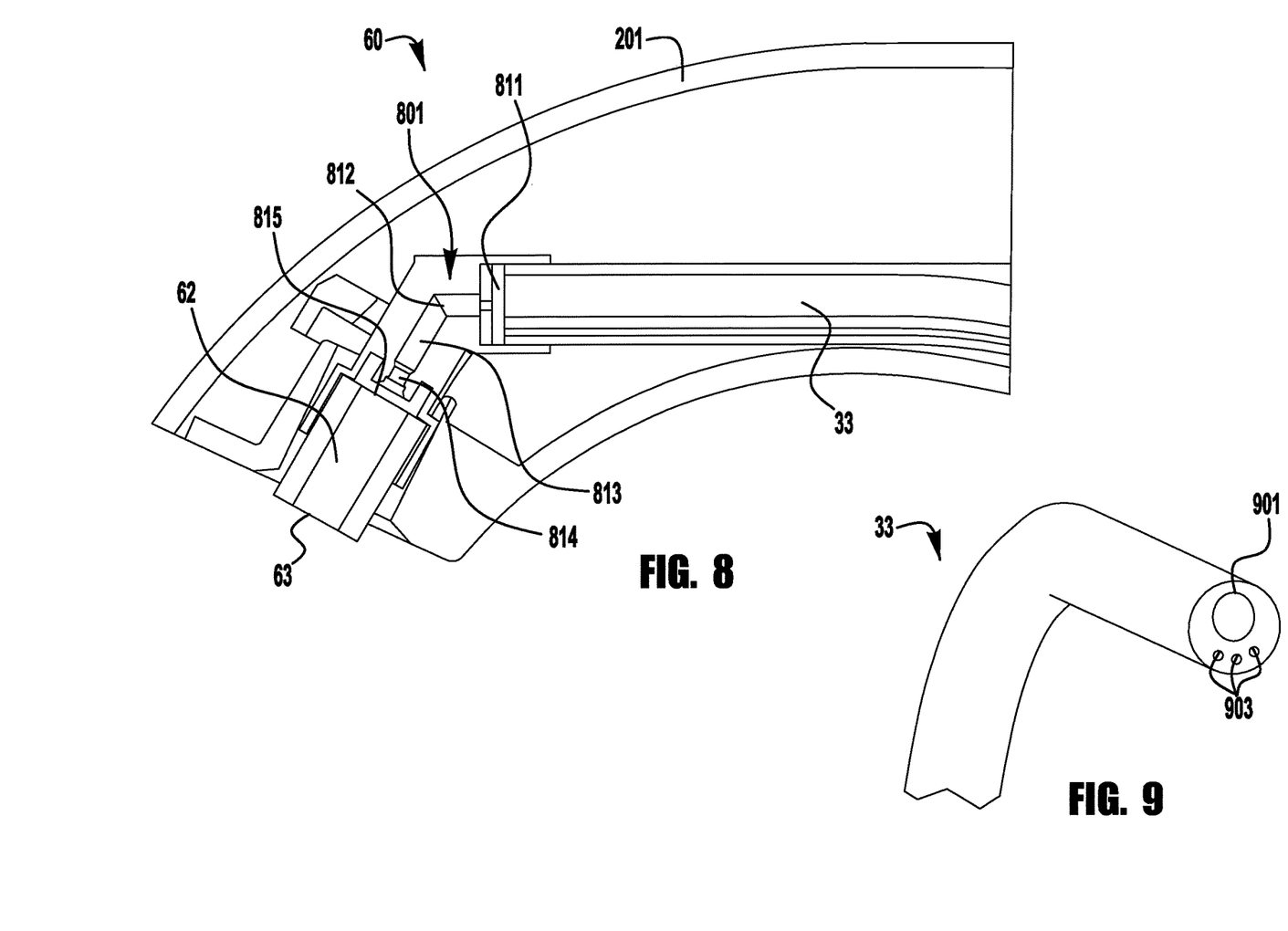
FIG. 8 is a partial cross-sectional view of the above-deck nozzle portion of FIG. 2.
FIG. 9 is a perspective view of an exemplary embodiment of a multi-lumen tubing or dispense passage for delivering liquid and air that is pumped by the pump of FIG. 3 to the above-deck nozzle portion of FIG. 2.

Referring to FIGS. 8 and 9, in certain embodiments, the multi-lumen dispense passage 33 is a multi-lumen tube having one or more liquid lumens 901 and two or more air lumens 903. The multi-lumen dispense passage 33 is in fluid communication with the pump outlet 302 (as shown in FIG. 3) and the dispense outlet 63 (as shown in FIGS. 2 and 8). The multi-lumen dispense passage 33 is connected to the pump 40 such that the two or more air lumens 903 are in fluid communication with the air passage 522 (FIGS. 5-7) of the pump outlet 302, and such that the one or more liquid lumens 901 are in fluid communication with the liquid passage 520 (FIGS. 5-7) of the pump outlet 302. As a result, the pump 40 pumps air through the two or more air lumens 903 and pumps liquid through the one or more liquid lumens 901.

In the illustrated embodiment, the multi-lumen dispense passage 33 includes one liquid lumen 901. In other embodiments, the multi-lumen dispense passage 33 can include two or more liquid lumens. In the illustrated embodiment, the multi-lumen dispense passage 33 includes three air lumens 903. In other embodiments, the multi-lumen dispense passage 33 can include less than three air lumens. In other embodiments, the multi-lumen dispense passage 33 can include more than three air lumens. For example, the multi-lumen dispense passage 33 can have two air lumens, three air lumens, four air lumens, five air lumens, etc. A multi-lumen dispense passage 33 with two or more air lumens 903 is advantageous because the multiple air lumens allow a desired amount of air to travel through the dispense passage without losing pressure. Comparatively, a single large air lumen would cause the pressure to be reduced over the length of the multi-lumen dispense passage 33. In certain embodiments, the pump 40 and the multi-lumen dispense passage 33 are configured such that the dispensed foamy mixture has an air to liquid ratio between about 5 to 1 and about 20 to 1. For example, the volume of the liquid pump chamber 412 and the air pump chambers 414, 416 may be selected based on the desired air to liquid ratio of the foamy mixture.

In some embodiments, multi-lumen dispense passage 33 has a circular cross-sectional shape. In some embodiments, air passages 903 are located proximate the periphery of multi-lumen dispense passage 33 as shown in FIG. 9.

Figure 10:
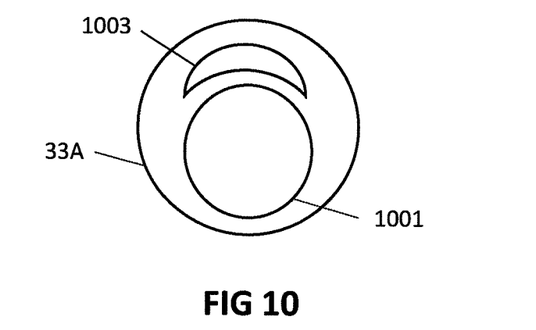
FIGS. 10 and 11 are a cross-sectional view of additional exemplary embodiments of a multi-lumen dispensing passage for delivering air and liquid.

FIG. 10 illustrates an exemplary embodiment of another multi-lumen dispense passage 33A. Multi-lumen dispense passage 33A has a circular cross-section and includes a liquid passage 1001. Liquid passage 1001 has a circular cross-section. Liquid passage 1001 is offset from the center of the multi-lumen passage device 33A. In addition, multi-lumen dispense passage 33A includes a single air passage 1003. Single air passage 1003 is has an elongated cross-section. In this exemplary embodiment, air passage 1003 has a "partial moon" shape. In some embodiments, the circular cross-section of the liquid passage 1001 allows the liquid passage 1001 to from a seal around an annular projection on the pump liquid outlet and/or the mixing chamber. In addition, in some embodiments, the circular outer surface of the multi-lumen dispense passage 33A allows for an easy seal with the pump air outlet and/or the mixing chamber.

Figure 11:
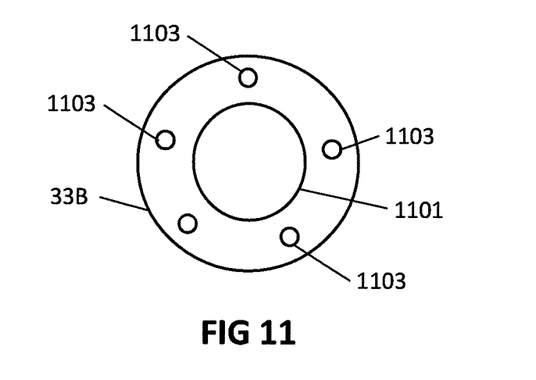

FIG. 11 illustrates exemplary embodiment of another multi-lumen passage 33B. Multi-lumen dispense passage 33B has a circular cross-section and includes a liquid passage 1101. Liquid passage 1101 has a circular cross-section. The center of liquid passage 1101 is aligned with the center of the multi-lumen passage device 33B. In addition, multi-lumen dispense passage 33B includes a plurality of air passages 1103. Air passages 1103 have a circular cross-section. Air passages 1103 are located around liquid passage 1101. In some embodiments, the circular cross-section of the liquid passage 1101 allows the liquid passage 1101 to from a seal around an annular projection on the pump liquid outlet and/or the mixing chamber. In addition, in some embodiments, the circular outer surface of the multi-lumen dispense passage 33B allows for an easy seal with the pump air outlet and/or the mixing chamber.

In some embodiments, the liquid passageways and air passageways have a circular cross-sectional shape. In some embodiments, the liquid and air passageways have an oval-shaped cross-sectional shape. In some embodiments, the liquid passageway has an elongated cross-sectional shape and air passageways have an circular cross-sectional shape.

In some embodiments, the cross-sectional area of the air passage(s) is less than 50% of the cross-sectional area of the liquid passage, including less than 40%, including less than 30%, including less than 25%. In some embodiments, the liquid passage and the two or more air passages have a circular cross-sectional shapes and the diameter of each of the air passages are less than 50% of the diameter of the liquid passage, including less than 40%, including less than 30%, including less than 25%, including less than 10%. In some embodiments, the cross-sectional area of the liquid passage is greater than about 5 times the cross-sectional area of the one or more of the air passages. In some embodiments, the cross-sectional area of the liquid passage is greater than about 4 times the cross-sectional area of the one or more of the air passages. In some embodiments, the cross-sectional area of the liquid passage is greater than about 3 times the cross-sectional area of the one or more of the air passages. In some embodiments, the cross-sectional area of the liquid passage is greater than about 2 times the cross-sectional area of the one or more of the air passages.

In some embodiments, the liquid passage 901 has a circular cross-section and has a diameter of between about 0.1 inches and 0.16 inches. In some embodiments, the liquid passage 901 has a circular cross-section and has a diameter of between about 0.11 inches and 0.14 inches. In some embodiments, the liquid passage 901 has a circular cross-section and has a diameter of between about 0.12 inches and 0.13 inches.

In some embodiments, liquid passage has a cross-sectional area of between about 0.01 and about 0.02 square inches. In some embodiments, liquid passage has a cross-sectional area of between about 0.012 and about 0.018. square inches. In some embodiments, liquid passage has a cross-sectional area of between about 0.014 and about 0.016. square inches.

In some embodiments, the air passages have a circular cross-section and the air passages have a diameter of between about 0.01 inches and 0.08 inches. In some embodiments, the air passages have a circular cross-section and have a diameter of between about 0.02 inches and 0.07 inches. In some embodiments, the air passages have a circular cross-section and have a diameter of between about 0.03 inches and 0.06 inches. In some embodiments, the air passages have a circular cross-section and have a diameter of between about 0.035 inches and 0.05 inches.

In some embodiments, one or more air passages have a cross-sectional area of between about 0.0005 and about 0.004 square inches. In some embodiments, one or more air passages have a cross-sectional area of between about 0.001 and about 0.0035 square inches. In some embodiments, one or more air passages have a cross-sectional area of between about 0.0015 and about 0.0030 square inches. In some embodiments, one or more air passages have a cross-sectional area of between about 0.0018 and about 0.0025 square inches. In some embodiments, one or more air passages have a cross-sectional area of between about 0.002 and about 0.0055 square inches.

Referring to FIG. 8, the multi-lumen dispense passage 33 extends through the housing 201 of the above-deck nozzle portion 60 such that the multi-lumen dispense passage 33 is in fluid communication with the dispense outlet 63. In certain embodiments, a mixing portion 801 is disposed between the multi-lumen dispense passage 33 and the dispense outlet 63. The mixing portion 801 is configured to allow the air and liquid to mix after exiting the multi-lumen dispense passage 33. In the illustrated embodiment, the mixing portion 801 includes a first mixing chamber 811, a conduit 813, and a second mixing chamber 815. The liquid and air exit the multi-lumen dispense passage 33 at the first mixing chamber 811 such that the air is directed into the liquid, which causes a foamy mixture that includes bubbles. In some embodiments, the first mixing chamber 811 is configured such that the liquid and air mix by changing directions and converging toward a single orifice of the conduit 813. In certain embodiments, the first mixing chamber 811 is sized such that bigger bubbles are formed in the foamy mixture. After the foamy mixture is formed in the first mixing chamber, the foamy mixture travels through the conduit 813. In certain embodiments, the conduit 813 includes an elbow portion 812, which redirects the foamy mixture and causes the liquid and air to further mix. In some optional embodiments, the conduit 813 includes a reduced portion 814 that has a reduced diameter, which causes a Venturi effect on the foamy mixture. This reduced portion 814 causes additional turbulence to further enhance the foamy mixture. In some embodiments, the conduit 813 is configured such that the bubbles of the foamy mixture expand after moving through the reduced portion 814. After the foamy mixture travels through the conduit 813, the foamy mixture enters an optional second mixing chamber 815 that has a larger diameter than the conduit 813, further enhancing the foamy mixture. The mixing portion 801 is an exemplary embodiment of the present invention. It should be understood, however, that any suitable mixing portion can be used that allows the liquid to mix with the air to create a foamy mixture.

In some embodiments, a foam cartridge 62 is disposed between the dispense passage and the dispense outlet 63. In the illustrated embodiment, the foam cartridge 62 is disposed between the mixing portion 801 and the dispense outlet 63, such that the foamy mixture from the mixing portion 801 enters the foam cartridge 62 to create a rich foam that is dispensed through the dispense outlet 63. The cartridge 803 can include one or more screens separated by an open mixing area that are configured to interact with the foamy mixture to create a rich foam. In one exemplary embodiment, the foaming cartridge includes two screens that are configured to interact with the foamy mixture to create a rich foam. In some embodiments, the foam cartridge 803 can include one or more sponges that interact with the foamy mixture to create a rich foam. Exemplary embodiments of foam cartridges are shown and described in U.S. Publication No. 2014/0367419, which is incorporated herein by reference in its entirety.

In some embodiments, the liquid passage is in a first tube and the air passages are located in one or more separate tubes. In some embodiments, dispense passage and tubing may be used interchangeably, thus, a multi-lumen passage may be a multi-lumen tubing.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A dispensing system, comprising:
    an above-deck nozzle portion having a dispenser outlet, wherein the above-deck nozzle portion is disposed above a counter;
    a reservoir for holding a fluid;
    a pump disposed below the counter, the pump comprising at least one liquid pump chamber in fluid communication with the reservoir, at least one air pump chamber, and a pump outlet having a liquid outlet and an air outlet separated from one another;
    a multi-lumen dispense passage comprising:
        an inlet in fluid communication with the pump outlet;
        an outlet in fluid communication with the dispenser outlet;
        one or more liquid lumens in fluid communication with the inlet and the outlet; and
        one or more air lumens in fluid communication with the inlet and the outlet;
        wherein if the one or more air lumens is a single air lumen, the single air lumen has an elongated cross-section;
        wherein if the one or more air lumen is two or more air lumens, the two or more air lumens do not have to have an elongated cross-section;
        wherein the cross-sectional area of the one or more liquid lumens is at least three times the cumulative cross-sectional area of the at least one air lumens;
    a mixing chamber disposed between the multi-lumen dispense passage and the dispenser outlet; and
    a foaming cartridge.

2. The dispensing system according to claim 1, wherein the multi-lumen dispense passage comprises three air lumens.

3. The dispensing system according to claim 1, wherein the cross-sectional area of the one or more liquid lumens is at least four times the cross-sectional area of the one or more air lumens.

4. The dispensing system according to claim 1, wherein the one or more air lumens are located about the periphery of the multi-lumen tubbing.

5. The dispensing system according to claim 1, wherein the one two or more air lumens have a circular cross-section.

6. The dispensing system according to claim 1, wherein the one or more liquid lumens has a circular cross-section.

7. The dispensing system according to claim 1, wherein the pump includes one liquid pump chamber and three air pump chambers.

8. The dispensing system according to claim 1, wherein the pump is a sequentially activated multi-diaphragm pump.

9. The dispensing system according to claim 1, further comprising a conduit with a reduced area upstream of the foaming cartridge.

10. A dispensing system, comprising:
    an above-deck nozzle portion having a dispenser outlet, wherein the above-deck nozzle portion is disposed above a counter;
    a reservoir for holding a fluid;
    a pump disposed below the counter, the pump comprising at least one liquid pump chamber in fluid communication with the reservoir, a plurality of air pump chambers, and a pump outlet having a liquid passage and an air passage, wherein the liquid passage of the pump outlet is in fluid communication with the at least one liquid pump chamber and is sealed off from the plurality of air pump chambers, and wherein the air passage of the pump outlet is in fluid communication with the plurality of air pump chambers and is sealed off from the at least one liquid pump chamber;

a multi-lumen dispense passage having at least two air lumens and at least one liquid lumen, wherein the at least two air lumens are in fluid communication with the air passage of the pump outlet, wherein the at least one liquid lumen is in fluid communication with the liquid passage of the pump outlet, and wherein the outlet is in fluid communication with the dispenser outlet; and a mixing portion;

wherein the mixing station is disposed between the multi-lumen dispense passage and the dispenser outlet.

11. The dispensing system according to claim 10, wherein the multi-lumen dispense passage has three air lumens.

12. The dispensing system according to claim 10, wherein the cross-sectional area of the liquid lumen is at least four times the cumulative cross-sectional area of the at least two air lumens.

13. The dispensing system according to claim 10, wherein the pump is a sequentially activated multi-diaphragm pump.

14. A dispensing system, comprising:
an nozzle portion having a dispenser outlet;
a reservoir for holding a fluid;
a sequentially activated multi-diaphragm foam pump comprising:
  a liquid pump diaphragm having a liquid pump chamber, wherein the liquid pump chamber is in fluid communication with the reservoir;
  a plurality of air pump diaphragms, each air pump diaphragm having an air pump chamber;
  a pump outlet having a liquid passage and an air passage, wherein the liquid passage is in fluid communication with the liquid pump chamber, and wherein the air passage is in fluid communication with the air pump chambers;
an actuation mechanism to sequentially activate the liquid pump diaphragm and the plurality of air pump diaphragms;
a multi-lumen dispense passage having at least one liquid lumen and at least two air lumens, wherein the at least two air lumens are in fluid communication with the air passage of the pump outlet, and wherein the at least one liquid lumen is in fluid communication with the liquid passage of the pump outlet, and wherein the multi-lumen dispense passage places the air passage and the liquid passage in fluid communication with dispenser outlet; and
a mixing portion disposed between the multi-lumen dispense passage and the dispenser outlet.

15. The dispensing system according to claim 14, wherein the multi-lumen dispense passage comprises at least one liquid lumen and at least three air lumens.

16. The dispensing system according to claim 14, wherein the foam pump includes three air pump chambers.

17. The dispensing system according to claim 14, wherein the mixing portion includes at least one mixing chamber.

18. The dispensing system according to claim 14, wherein the mixing portion comprises a conduit that includes a reduced portion that has a smaller diameter than a majority of the conduit.

19. The dispensing system according to claim 14, wherein the mixing portion is disposed above the counter.

20. The dispensing system according to claim 14, wherein the actuation mechanism comprises a wobble plate.

* * * * *